(12) United States Patent
Kan (10) Patent No.: US 11,852,469 B2
(45) Date of Patent: Dec. 26, 2023

(54) LENGTH MEASURING APPARATUS

(71) Applicant: Kan Mechanical Industry, Inc., Matsuyama (JP)

(72) Inventor: Eiji Kan, Matsuyama (JP)

(73) Assignee: Kan Mechanical Industry, Inc., Matsuyama (JP)

( * ) Notice: Subject to any disclaimer, the term of this patent is extended or adjusted under 35 U.S.C. 154(b) by 34 days.

(21) Appl. No.: 17/676,212

(22) Filed: Feb. 20, 2022

(65) Prior Publication Data

US 2022/0170728 A1    Jun. 2, 2022

Related U.S. Application Data

(63) Continuation-in-part of application No. PCT/JP2021/016114, filed on Apr. 21, 2021.

(30) Foreign Application Priority Data

May 13, 2020  (JP) .................................. 2020-084212
Oct. 22, 2020  (JP) .................................. 2020-177036

(51) Int. Cl.
  *G01B 5/02* (2006.01)
  *G01B 3/20* (2006.01)
  *G01B 5/24* (2006.01)

(52) U.S. Cl.
  CPC .............. *G01B 5/02* (2013.01); *G01B 3/205* (2013.01); *G01B 5/24* (2013.01)

(58) Field of Classification Search
  CPC ............. G01B 5/02; G01B 3/205; G01B 5/24
  See application file for complete search history.

(56) References Cited

U.S. PATENT DOCUMENTS 2,802,271 A * 8/1957 Welch .................... G01B 3/563
                                                    33/464
4,843,728 A * 7/1989 Francis .................. B23Q 9/005
                                                    33/640

(Continued)

FOREIGN PATENT DOCUMENTS

JP     S48-037890 Y    11/1973
JP     S59-0074040 U1   5/1984

(Continued)

OTHER PUBLICATIONS

JP-2016155176-A; Kan, "Length Measuring Device", Sep. 2016 (Year: 2016).*

(Continued)

*Primary Examiner* — John Fitzgerald
*Assistant Examiner* — Tania Courson
(74) *Attorney, Agent, or Firm* — JTT Patent Services, LLC; Gerald T. Peters (57) ABSTRACT

A length measuring apparatus for use in combination with a cutting device having a cutting blade to measure length of a workpiece cut by the cutting blade comprises a slide rail which is secured relative to the cutting device when length is measured; and a sliding unit that is slidably mounted to the slide rail, the sliding unit having a sliding body, a length measuring unit that measures distance along which the sliding body slides relative to the slide rail, and an arm member that comes in contact with the workpiece when the workpiece is placed at a cutting position; wherein the sliding unit further comprises an angle gauge member, mounted at that tip portion of the arm member which comes in contact with the workpiece, that comes in contact with the cutting blade and measures a cutting angle of the cutting blade.

3 Claims, 11 Drawing Sheets

(56) References Cited

U.S. PATENT DOCUMENTS

| | | | |
|---|---|---|---|
| 6,766,583 B2 * | 7/2004 | Economaki | G01B 3/56 33/534 |
| 9,316,477 B1 * | 4/2016 | Wu | G01B 5/24 |
| 2007/0251366 A1 | 11/2007 | Dawley | |
| 2009/0001648 A1 | 1/2009 | Wakabayashi et al. | |
| 2016/0097628 A1 | 4/2016 | Wu | |

FOREIGN PATENT DOCUMENTS

| | | |
|---|---|---|
| JP | S60-013402 U1 | 1/1985 |
| JP | H08-334302 A | 12/1996 |
| JP | 2003-177001 A | 6/2003 |
| JP | 2009-007117 A | 1/2009 |
| JP | 2012-002706 A | 1/2012 |
| JP | 2015-152400 A | 8/2015 |
| JP | 2016-155176 A | 9/2016 |
| JP | 2017-217713 A | 12/2017 |
| WO | 2015 122206 A1 | 8/2015 |
| WO | 2016 136103 A1 | 9/2016 |

OTHER PUBLICATIONS

WO-2021230024-A1; Kan et al., "Length Measurement Device For Measuring Length Of Workpiece Cut To Predetermined Length By Cutting Device, Has Angle Gauge Portion Which Comes In Contact With Cutting Blade And Which Measures Cutting Angle Of Cutting Blade", Nov. 2021. (Year: 2021).*

DE-112015006210-T5; Kan, "Length Measuring Instrument", Nov. 2017. (Year: 2017).*

JP-2015152400-A; Kan, "Length Measurement Instrument", Aug. 2015. (Year: 2015).*

JP-2012002706-A; Kan, "Length Measurement Apparatus, Has Urging Part Urging Contact Guide Body On Article, Measuring Device Measuring Distance Of Abutting Guide Body, And Guide Groove Provided With Magnetic Strip That Is Detected By Sensor", Jan. 2012. (Year: 2012).*

SE-450942-B; Johansson, "Ruling With One or Multiple Adjustable and Adjustable Mats Memory", Aug. 1987. (Year: 1987).*

CN-104149217-A; Kong, "Ceramic Tile Cutting Machine Has Angle No. Display Module That Includes Two Shells Which Are Provided With Data Display Window, Data Regulating Knob, Reset Button And Switch Button, Respectively", Nov. 2014 (Year: 2014).*

JP-2021181974-A; Suga, "Length Measuring Apparatus", Nov. 2021. (Year: 2021).*

JP-2018066672-A; Kan, "Length Measurement Device", Apr. 2018. (Year: 2018).*

International Search Report dated Jul. 20, 2021 in PCT/JP2021/016114 which published as WO 2021 230024 A1 on Nov. 18, 2021 and which is the International Application of which the present application is a continuation-in-part. Submitted additionally for US Pat App Pub and Frn Pat Doc.

International Search Report dated Mar. 22, 2016 in PCT/JP2015/085302 which published as WO 2016 136103 A1 on Sep. 1, 2016. Submitted additionally for Frn Pat Doc.

International Search Report dated Apr. 7, 2015 in PCT/JP2015/050088 which published as WO 2015 122206 A1 on Aug. 20, 2015. Submitted additionally for Frn Pat Doc.

* cited by examiner

LENGTH MEASURING APPARATUS

CROSS-REFERENCE TO RELATED APPLICATION, BENEFIT AND PRIORITY CLAIMS, AND INCORPORATION BY REFERENCE

This application is a continuation-in-part of and claims benefit under 35 USC 120 and 365(c) to copending International Application No PCT/JP2021/016114, entitled "Length Measuring Apparatus", filed 21 Apr. 2021; further claims benefit of priority under 35 USC 119(a)-(d) to Japanese Patent Application No 2020-084212, entitled "Length Measuring Apparatus", filed 13 May 2020; and further claims benefit of priority under 35 USC 119(a)-(d) to Japanese Patent Application No 2020-177036, entitled "Length Measuring Apparatus", filed 22 Oct. 2020, the contents of all of which applications are incorporated herein in their entireties by reference.

FIELD OF THE INVENTION

The present invention relates to a length measuring apparatus that measures length(s) of workpiece(s) cut by cutting device(s).

BACKGROUND

Cutting devices carry out machining by cutting a workpiece that is being machined. To use such a cutting device to cut the workpiece at a precise cutting location, it is desirable to be able to precisely measure the length from a desired place on the workpiece to the cutting location.

This being the case, a length measuring apparatus that measures the length of a workpiece to be cut by a cutting device is desired. A length measuring apparatus might, for example, be constituted such that a slider having a length measuring unit which is slidably mounted with respect to a slide rail is provided with a contacting portion that contacts an end face of a workpiece, length of the workpiece being measured based on a value measured by the length measuring unit when this contacting portion is in contact with the end face of the workpiece.

It is sometimes the case at the cutting device that a workpiece is to be cut at a cutting angle which is not perpendicular to the direction in which the length of the workpiece is measured but at a cutting angle which is inclined by a prescribed angle with respect thereto, in which case the cutting blade of the cutting device might be rotated by a prescribed angle relative to cut the workpiece.

However, as it is difficult to rotate the cutting blade of a cutting device so that it is precisely positioned at a location of a prescribed angle, it will often be the case that there will be occurrence of several degrees or more of misalignment relative to the desired cutting angle.

There is therefore a need for a length measuring apparatus capable of causing the cutting blade of a cutting device to be precisely positioned at a desired location and/or at a desired cutting angle.

SUMMARY OF INVENTION

In the context of a length measuring apparatus for use in combination with a cutting device having a cutting blade to measure a length of a workpiece cut by the cutting blade, a length measuring apparatus associated with one embodiment of the present invention may be equipped with a slide rail which is secured relative to the cutting device when the length is measured; and a sliding unit that is slidably mounted to the slide rail, the sliding unit having a sliding body, a length measuring unit that measures a distance along which the sliding body slides relative to the slide rail, and an arm member that comes in contact with the workpiece when the workpiece is placed at a cutting position; wherein the sliding unit is further equipped with an angle gauge member, mounted on that tip portion of the arm member which comes in contact with the workpiece, that comes in contact with the cutting blade and measures a cutting angle of the cutting blade.

A length measuring apparatus associated with at least one embodiment of the present invention may be such that use of an angle gauge member mounted on the length measuring apparatus to measure a cutting angle of a cutting blade before performing cutting with a cutting device makes it possible to cut a workpiece such that the cutting blade is precisely positioned at a desired location and/or at a desired cutting angle.

Other embodiments, systems, methods, and features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

EMBODIMENTS FOR CARRYING OUT INVENTION

Length measuring apparatuses associated with a first embodiment of the present invention are described in detail below with reference to the drawings. Whereas length measuring apparatus 1 measures the length of a workpiece which is to be cut to a desired length by a cutting device 9, it may alternatively or additionally permit measurement of the cutting angle of cutting blade 91 of cutting device 9, and/or permit cutting blade 91 to be positioned at a desired cutting angle.

Figure 1:
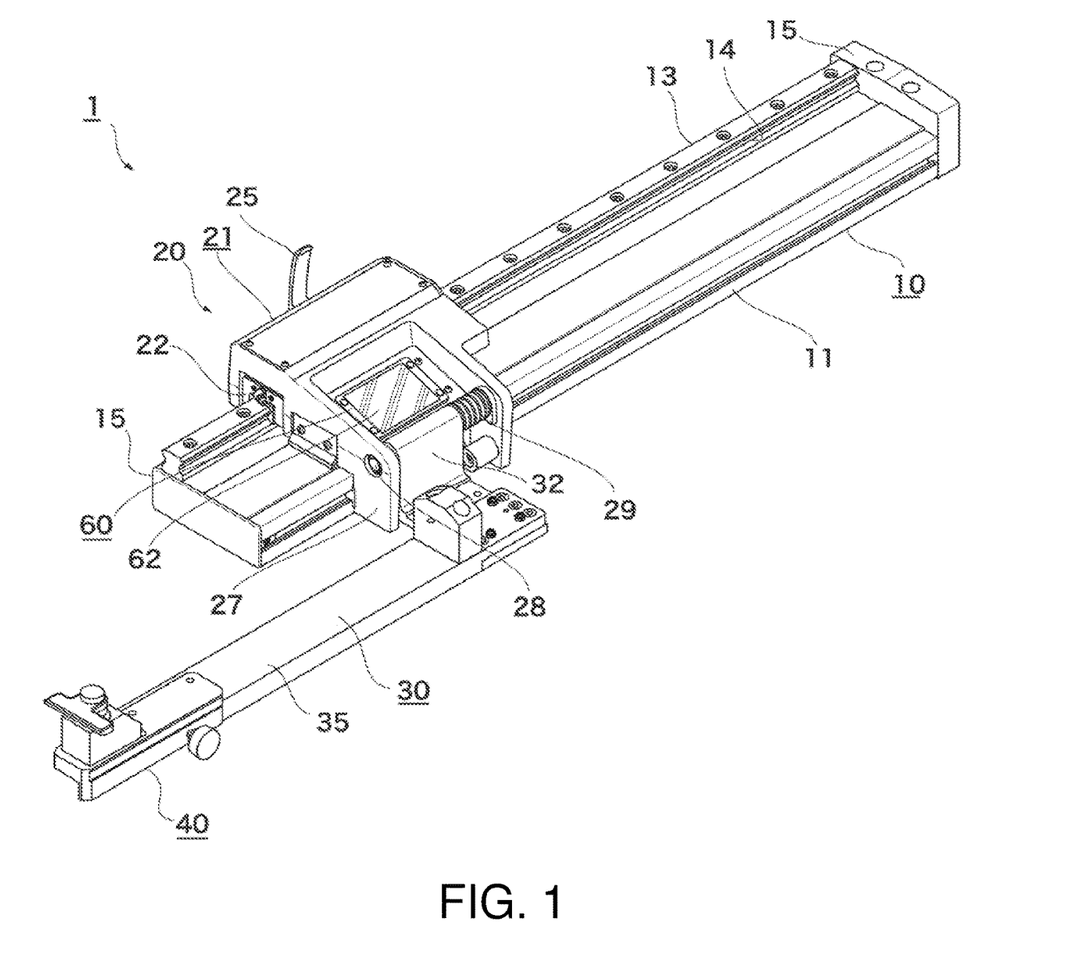
FIG. 1 is a perspective view of a length measuring apparatus associated with a first embodiment of the present invention.

Length measuring apparatus 1 is equipped with base unit 10 which is secured to cutting device 9, and with sliding unit 20 which is slidably mounted with respect to base unit 10. Base unit 10 is equipped with oblong base platform 11, and slide rail 13 which is mounted on base platform 11 so as to be parallel to the length direction (length measuring direction).

Formed at slide rail 13 to either side in the sliding direction which is the length direction thereof is a pair of slide grooves 14 that extend in the sliding direction. Furthermore, mounted at either end in the length direction of slide rail 13 is a slide stopper 15 for preventing sliding unit 20 from becoming detached from the end of slide rail 13.

Sliding unit 20 is provided with sliding body 21, arm member 30 which makes contact with the workpiece, angle gauge member 40, and digital length measuring unit 60, sliding body 21 being mounted so as to be capable of sliding in the length direction relative to slide rail 13.

Sliding body 21 is provided with linear guide 22 which is secured to sliding body 21, clamp 25 for securing sliding body 21 so as to make it incapable of sliding relative to slide rail 13, and arm retaining unit 27 for retaining arm member 30.

Arm retaining unit 27 is provided with arm support shaft 28 which extends in the sliding direction; and spring 29, through which arm support shaft 28 passes. Spring 29 is installed so that when in a compressed state it will come in contact with arm member 30 which is supported by arm support shaft 28, the constitution being such that the elastic force therefrom causes arm member 30 to exert a restoring force which is directed toward the cutting location of cutting device 9 in the sliding direction.

Clamp 25 is such that actuation of a clamp lever permits switching between a secured state in which sliding body 21 is secured relative to slide rail 13, and an unsecured state in which sliding body 21 is free to slide relative to slide rail 13.

Arm member 30 is provided with trunk portion 32 in which a support shaft hole through which arm support shaft 28 of sliding body 21 passes is formed, and bar portion 35 which extends from trunk portion 32 so as to be directed toward the cutting location. Bar portion 35 is such that the tip thereof comes in contact with the workpiece during measurement of length. Bar portion 35 is such that formed at the tip end portion thereof are coupling holes 36 for causing angle gauge member 40 to be removably coupled therewith and secured thereto.

Figure 2:
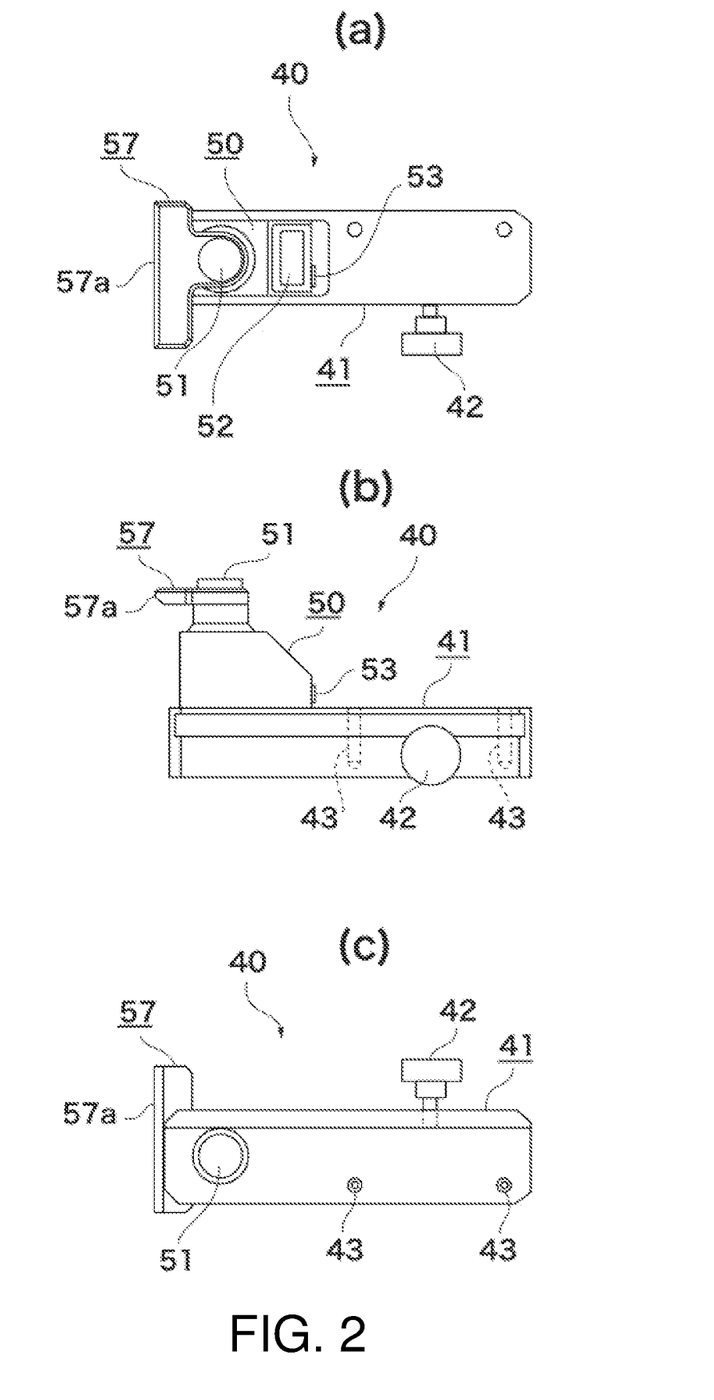
FIG. 2 is a drawing showing the constitution of an angle gauge member associated with the first embodiment of the present invention.
Figure 3:
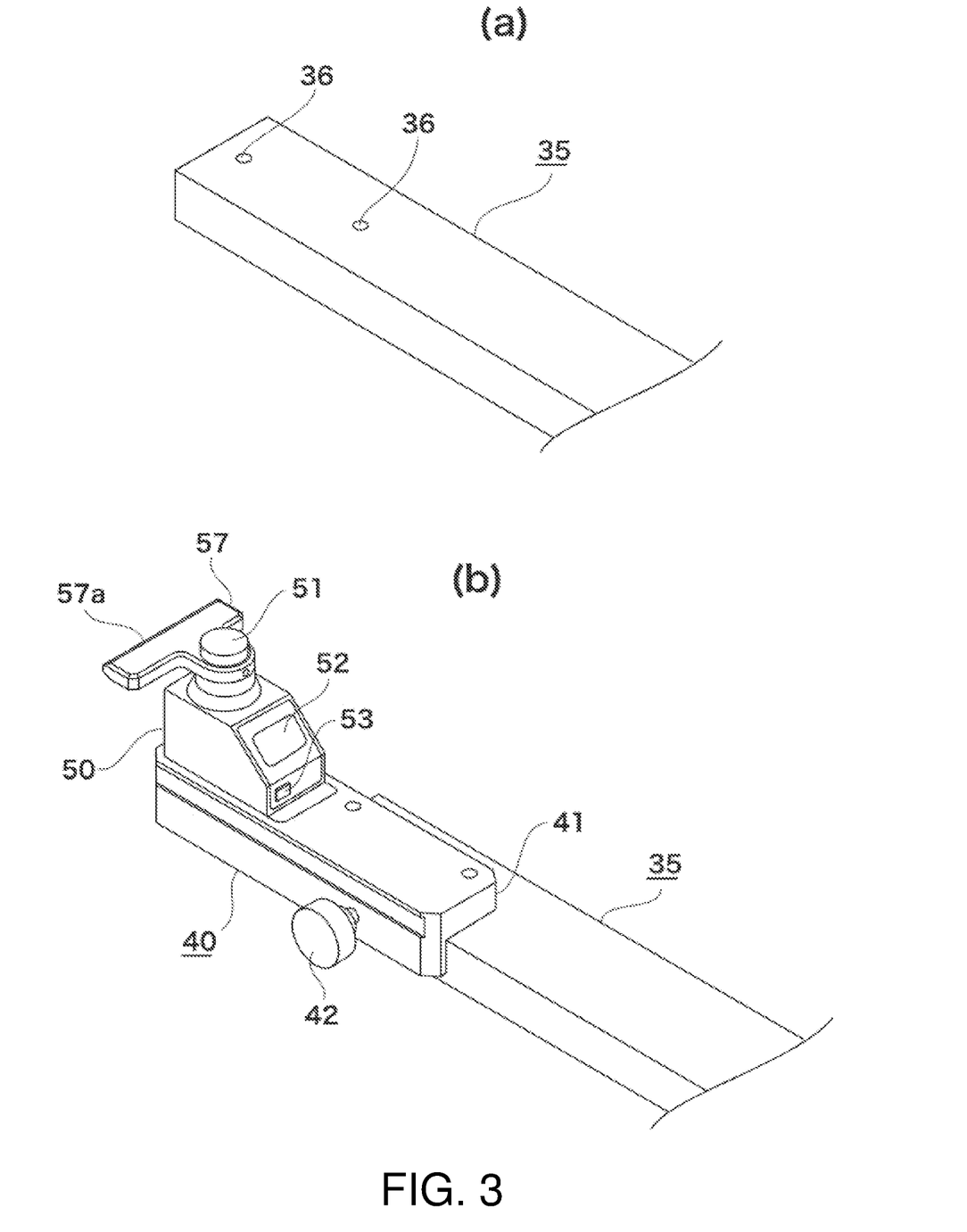
FIG. 3 is a drawing to assist in describing how the angle gauge member associated with the first embodiment of the present invention might be mounted.

Angle gauge member 40, when attached to the tip end of arm member 30, is used to measure the cutting angle of cutting blade 91 of cutting device 9. FIG. 2 (*a*) is a plan view of angle gauge member 40; FIG. 2 (*b*) is a front view of angle gauge member 40; FIG. 2 (*c*) is a bottom view of angle gauge member 40. FIG. 3 (*a*) is a perspective view showing removable angle gauge member 40 when in a state in which it has been removed from bar portion 35 of arm member 30; FIG. 3 (*b*) is a perspective view showing angle gauge member 40 when in a state in which it is mounted to bar portion 35 of arm member 30.

Angle gauge member 40 measures the cutting angle, which is the angle that cutting blade 91 is rotated relative to the initial position thereof. Although the initial position of cutting blade 91 is normally the state in which as seen in plan view it appears to be perpendicular to the sliding direction of length measuring apparatus 1 (the direction in which the length of the workpiece is measured), the initial position of cutting blade 91 may of course be varied as appropriate.

Angle gauge member 40 is provided with oblong gauge base platform 41, digital angle gauge 50 which is secured to the top surface of gauge base platform 41, and rotary contacting unit 57 which comes in contact with cutting blade 91. Gauge base platform 41, which is removably attached to the tip portion of bar portion 35 of arm member 30, is provided with securing screw 42 for coupling it therewith and securing it thereto, and more or less cylindrical coupling projections 43 which are inserted in coupling holes 36 of bar portion 35.

Digital angle gauge 50 is provided with input shaft 51 which is the measurement angle input shaft, display unit 52 which is a display that displays measurement results in digital fashion, and reset button 53 which resets the measured angle to 0°.

Rotary contacting unit 57 is secured to input shaft 51 of digital angle gauge 50, and rotates in integral fashion with input shaft 51. Rotary contacting unit 57 is formed so as to appear more or less T-shaped as seen in plan view, the basal portion of the "T" being the center of rotation thereof and being secured to input shaft 51, and the top end portion of the "T" being the rotating tip thereof and functioning as contacting surface 57*a* for coming in contact with cutting blade 91.

Digital angle gauge 50 measures positive values in what appears to be the counterclockwise direction as seen in plan view, the position at which the measurement angle was reset by means of reset button 53 being taken to be the reference position, the rotational angle from this reference position being displayed as the measured value at display unit 52. At such time, digital angle gauge 50 is constituted so as to display not the total angle through which rotary contacting unit 57 has rotated from the reference position but the angle from the reference position to the current position of rotary contacting unit 57.

In accordance with the present embodiment, contacting surface 57*a* serving as contacting portion for coming in contact with cutting blade 91 of angle gauge member 40 is mounted at a location such as will cause it to protrude on the order of 10 cm beyond the tip of bar portion 35 of arm member 30 when located at a reference position such as will cause it to come in contact with cutting blade 91 when at the initial position thereof, described below. It is ordinarily the case when measuring length for an operation in which a workpiece is to be cut that sliding body 21 is made to slide toward the location of the cutting position so as to cause the tip of arm member 30 to contact the workpiece which is placed at the cutting position below cutting blade 91.

For this reason, when securing length measuring apparatus 1 to cutting device 9, it is usually the case at sites where cutting is performed that this will be secured thereto in such fashion as to cause the tip of bar portion 35 to be located in the vicinity of the cutting position when sliding body 21 has been made to slide as far as it will go toward the cutting position, so as to make it possible to accommodate various workpiece cutting lengths (e.g., short cutting lengths).

Therefore, if contacting surface 57a—which is for contacting cutting blade 91—of angle gauge member 40 is located in the vicinity of the tip of bar portion 35, it is entirely possible that contacting surface 57a may not reach cutting blade 91 even when sliding body 21 has been made to slide as far as it will go toward the cutting position.

To address this, by as in the present embodiment causing angle gauge member 40 to be constituted and mounted on arm member 30 such that contacting surface 57a when located at the initial position thereof protrudes 10 cm beyond the tip of bar portion 35 (i.e., so as to protrude in the direction of an imaginary line extending the length of bar portion 35 and causing contacting surface 57a to be nearer to the cutting position), it will be possible to more definitively cause contacting surface 57a to come in contact with cutting blade 91, and to permit measurement of angles by angle gauge member 40 to be carried out more definitively.

The length by which contacting surface 57a protrudes past the tip of bar portion 35 may of course be varied as appropriate; to cause contacting surface 57a to more definitively reach the surface of cutting blade 91, it is preferred that it be located such that it protrudes further in the tip direction beyond the tip of bar portion 35, it being preferred that it protrude therebeyond by not less than 3 cm, and more preferred that this be not less than 7 cm.

Digital length measuring unit 60 is equipped with distance measuring unit 61 (not shown) which measures the distance that sliding body 21 slides along slide rail 13, display unit 62 which is a display that digitally displays the value measured by distance measuring unit 61, and reset button 65 (not shown) which resets the value measured by distance measuring unit 61.

Here, length measuring apparatus 1 is for measuring the distance from a machining location (cutting location) of the workpiece to a prescribed portion of the workpiece which serves as measurement target, and distance measuring unit 61 is constituted so as to output a measured value which is the distance from a datum, this datum being the location at which the sliding distance was reset by reset button 65.

Distance measuring unit 61 is constituted so as to carry out measurement such that the direction (what is more or less toward the right at FIG. 4) of increasing distance from the cutting location is the positive direction, and so as to display not the total distance that sliding body 21 has slid from the datum but the distance from the datum to the current location of sliding body 21.

Note that the foregoing digital angle gauge 50 and digital length measuring unit 60 may be driven by internal batteries (not shown), in which case there will be no need for these to be connected by cords to power supplies, and as length measuring apparatus 1 will not require wiring it will be possible to freely choose the location at which it is mounted.

Figure 4:
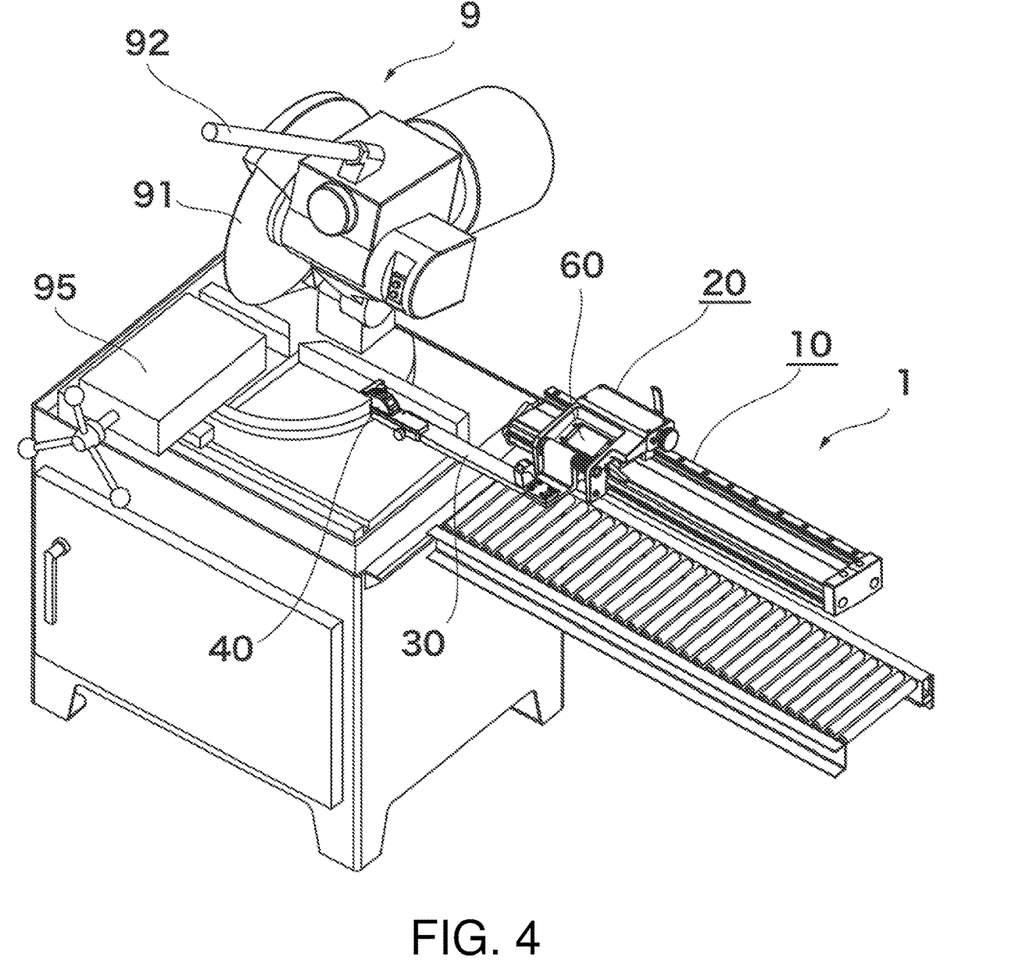
FIG. 4 is a perspective view to assist in describing a manner in which the length measuring apparatus associated with the first embodiment of the present invention might be used.

Next, the constitution of cutting device 9, to which length measuring apparatus 1 is coupled and secured, will be described with reference to FIG. 4 and so forth. Cutting device 9 is provided with cutting blade 91 which is a rotary blade for cutting the workpiece, engagement/retraction lever 92 which moves cutting blade 91 vertically between a cutting position at which it cuts the workpiece and a retracted position, and workpiece securing member 95 which is secures and retains the workpiece at the time of cutting.

Furthermore, cutting device 9 is constituted such that cutting blade 91 is capable of being made to swivel about what as seen in plan view will appear to be the cutting position which is located below the lowermost edge of disk-shaped cutting blade 91 as a result of actuation of engagement/retraction lever 92. Engagement/retraction lever 92 thus also serves as swivel lever.

The present embodiment is constituted so that cutting blade 91 is capable of being made to swivel in either the clockwise or the counterclockwise direction through on the order of 0° to 65°, where the initial position thereof (0°) is taken to be the position at which cutting blade 91 is perpendicular to the length measuring direction, i.e., the sliding direction, of length measuring apparatus 1.

Figure 5:
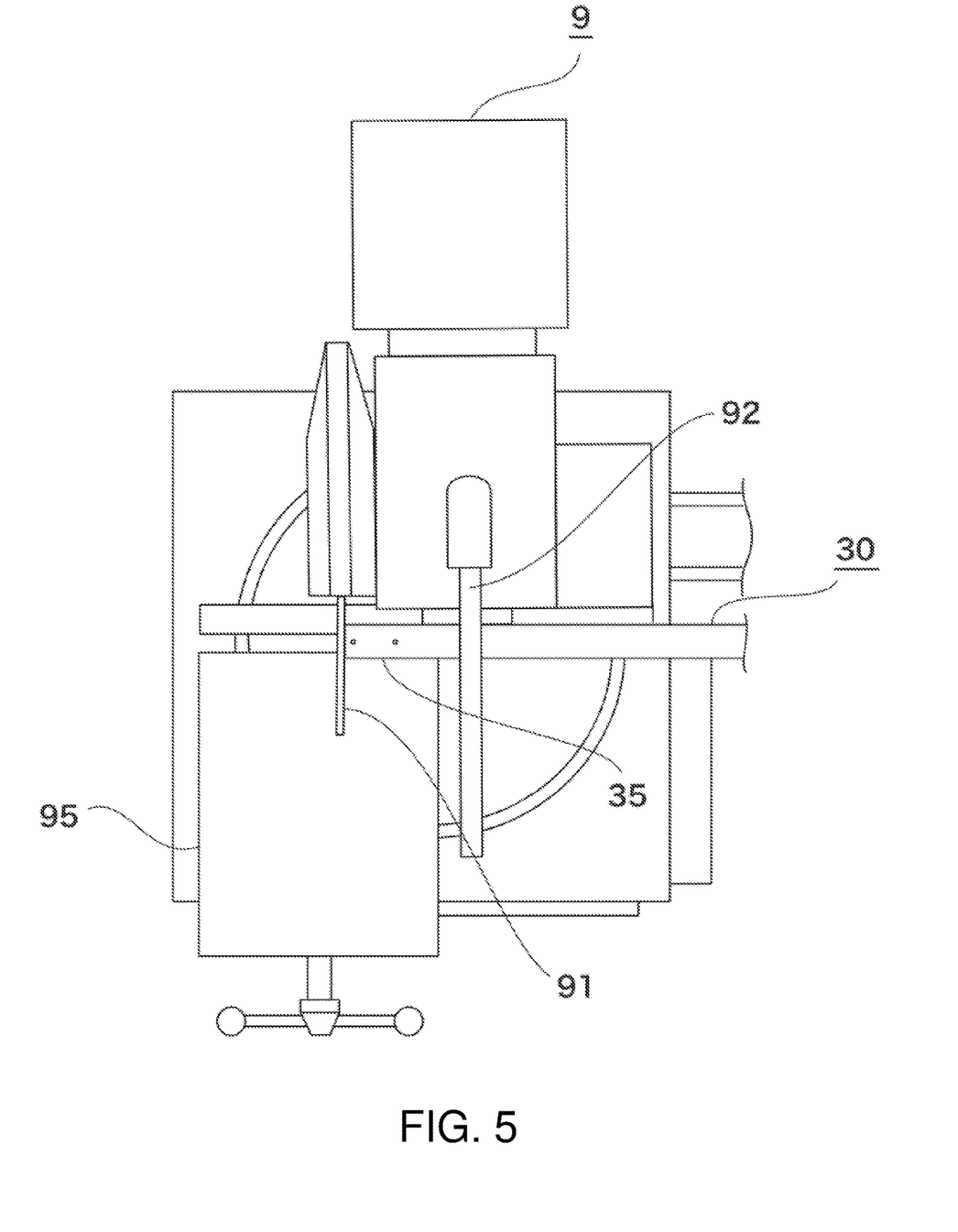
FIG. 5 is a plan view to assist in describing a manner in which the length measuring apparatus associated with the first embodiment of the present invention might be used.

The foregoing being description of the constitutions of length measuring apparatus 1 and cutting device 9, description will next be given with reference to FIG. 5 through FIG. 7 and so forth regarding a procedure that may be employed when using cutting device 9 carry out cutting in which a workpiece is cut to a desired length at a desired cutting angle. The present embodiment will be described in terms of an example in which cutting blade 91 is made to swivel 45° from the initial position thereof and the workpiece is cut. At FIG. 5 and FIG. 6, cutting blade 91 is in a state in which it is at a cutting angle of 0°; i.e., the initial position thereof. At FIG. 7, cutting blade 91 is in a state in which it has been made to swivel to a position at which the cutting angle is 45°.

When carrying out cutting in accordance with the present embodiment, angle gauge member 40 is first used to cause cutting blade 91 of cutting device 9 to be precisely swiveled and positioned so as to be at a desired cutting angle, the workpiece is thereafter placed thereon as length measuring apparatus 1 is used to measure the cutting length of the workpiece, and cutting device 9 is finally used to cut the workpiece.

More specifically, before placing the workpiece thereon, the datum at length measuring apparatus 1 (digital length measuring unit 60) is first reset. Resetting of the datum for the sliding distance at digital length measuring unit 60 is carried out while cutting blade 91 of cutting device 9 is in a state in which it located at the initial position (0°) at which it is perpendicular to the length measuring direction, sliding unit 20 being made to slide until the tip of arm member 30, from which angle gauge member 40 has been removed, comes in contact with the surface of cutting blade 91 (see FIG. 5). With the tip of arm member 30 thus in a state in which it has been made to be precisely located at the cutting position, reset button 65 of digital length measuring unit 60 is pressed, causing the measured value to be reset to 0.

Adjustment of the cutting angle of cutting blade 91 is then carried out. Angle gauge member 40 is first secured to and mounted on the tip of arm member 30. More specifically, coupling projections 43 of angle gauge member 40 are inserted into coupling holes 36 of bar portion 35, and securing screw 42 is thereafter tightened so as to secure angle gauge member 40 to bar portion 35.

Figure 6:
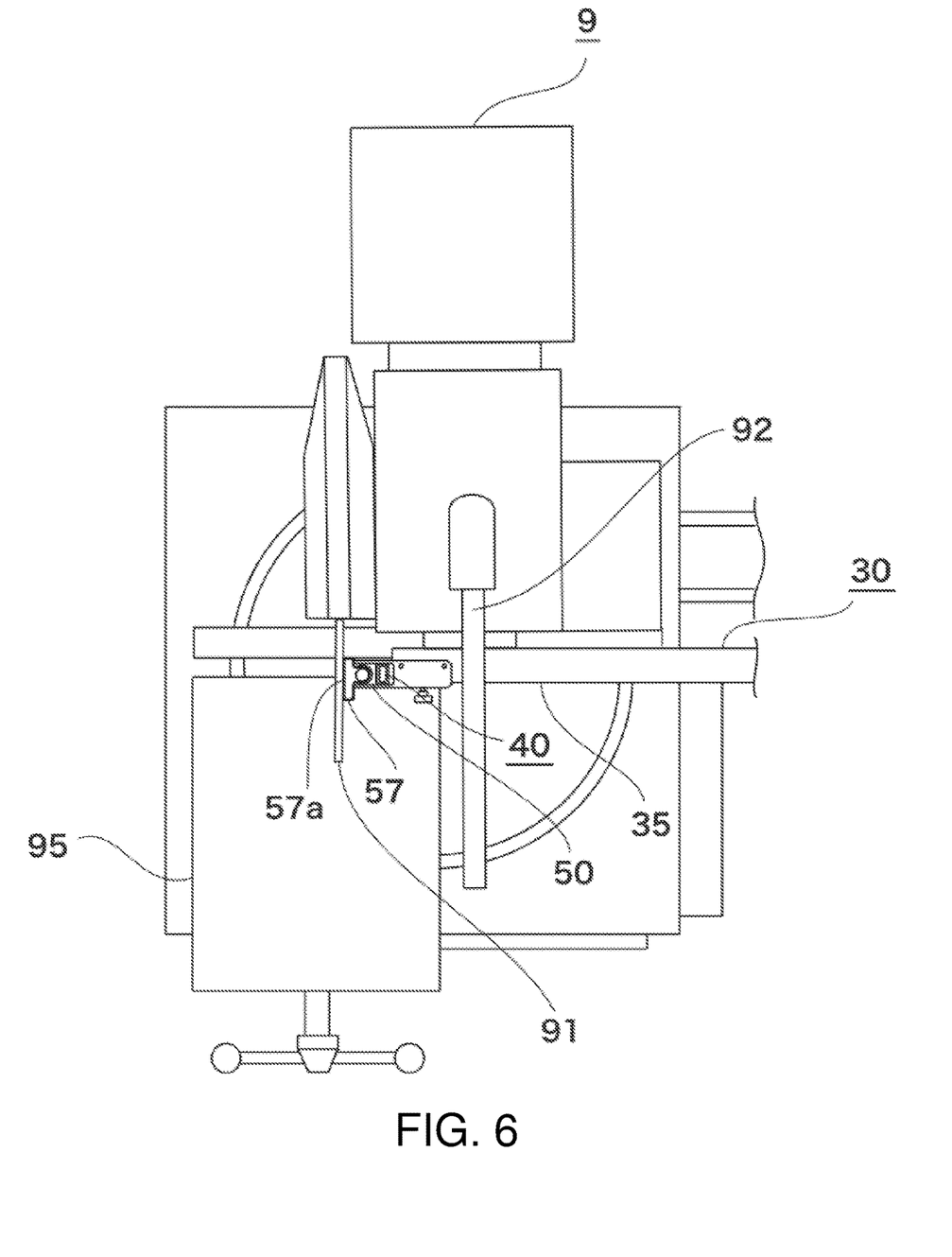
FIG. 6 is a plan view to assist in describing a manner in which the length measuring apparatus associated with the first embodiment of the present invention might be used.
Figure 7:
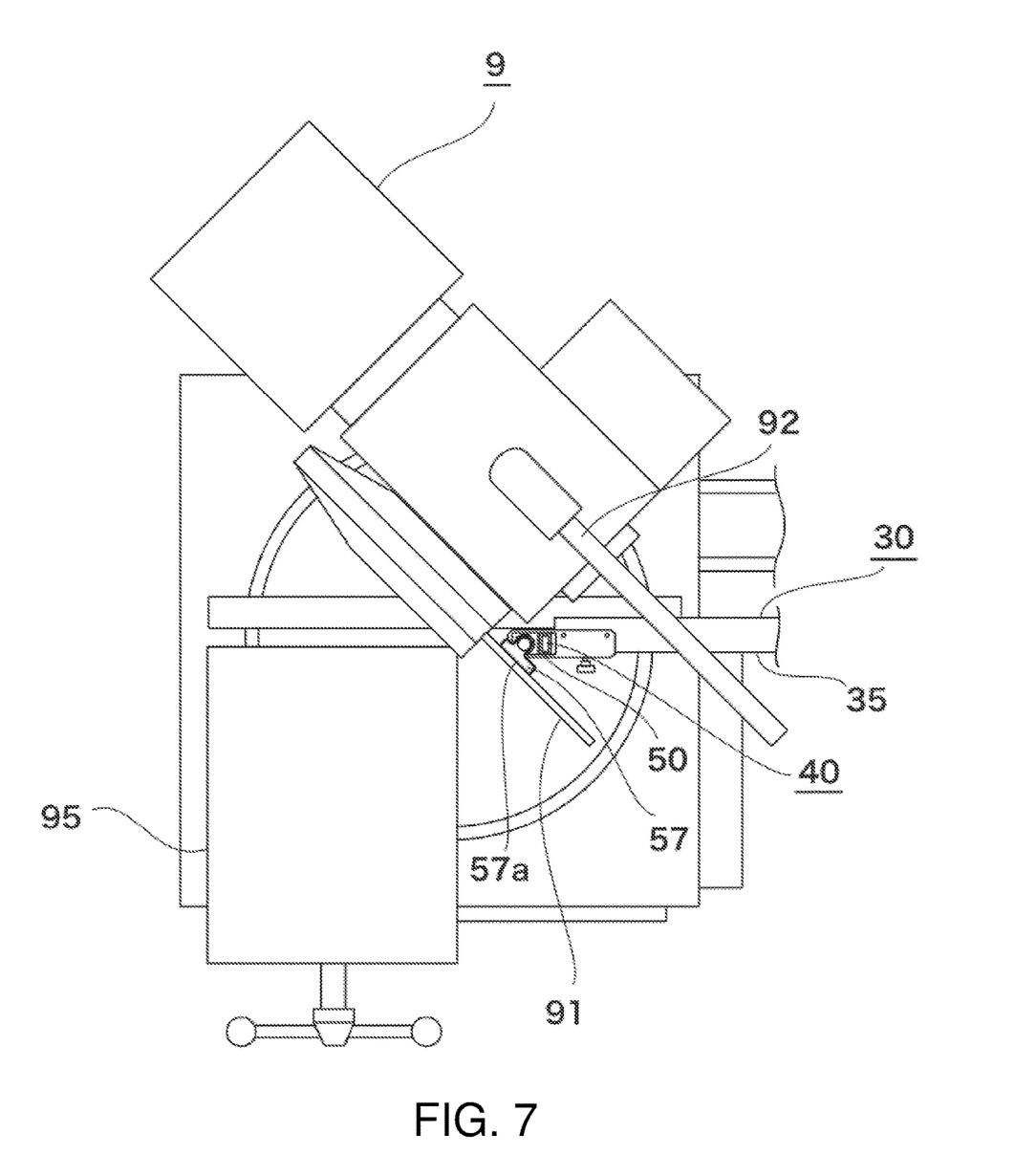
FIG. 7 is a plan view to assist in describing a manner in which the length measuring apparatus associated with the first embodiment of the present invention might be used.

In accordance with the present embodiment, because the aforementioned initial position (0°) will be the reference position, sliding unit 20 is made to slide until contacting surface 57a of angle gauge member 40 is made to come into surfacial contact with that surface of cutting blade 91 which is toward length measuring apparatus 1 when cutting blade 91 is in its initial position (see FIG. 6). After these have been made to come in contact, reset button 53 of digital angle gauge 50 is pressed, causing the measured angle to be reset to 0°.

Next, sliding unit 20 is made to slide, causing angle gauge member 40 to be retracted, and cutting blade 91 is swiveled to a position at which it is at the desired cutting angle of 45°. Because it is ordinarily the case where the cutting angle is variable and cutting device 9 is capable of being swiveled that an angle memory will be mounted thereon such as will serve as rough guide for the swivel angle of cutting blade 91, the operator might cause cutting blade 91 to be swiveled to the desired angular position while viewing this angle memory.

After this has been swiveled thereto, fine adjustment is carried out so as to cause the cutting angle of cutting blade 91 to be precisely 45°. When carrying out fine adjustment, by causing contacting surface 57a of angle gauge member 40 to come in contact with cutting blade 91 (see FIG. 7) and repeatedly measuring the cutting angle of cutting blade 91 with angle gauge member 40, it is possible to carry out fine adjustment of the swivel angle until that measured value is precisely 45°.

Following adjustment of the cutting angle of cutting blade 91, angle gauge member 40 is removed from bar portion 35, positioning of sliding unit 20 is then carried out as length is measured with digital length measuring unit 60 so that the workpiece can be cut to the desired length.

More specifically, sliding unit 20 is made to slide until the tip of bar portion 35 of arm member 30 which is in contact with the workpiece is positioned at a location that is separated by the desired length from the cutting position. When sliding unit 20 is made to slide in a direction which causes there to be increasing distance from the cutting location, display unit 62 of digital length measuring unit 60 displays the distance that sliding unit 20 has moved from the location (cutting position) at which the measured value was just reset, i.e., the distance from the cutting position to the tip of bar portion 35.

In addition, sliding unit 20 is stopped and secured at a location which causes the measured value at display unit 62 to be the numeric value of the desired length. Upon so doing, the distance from the cutting position which serves as datum to the tip of bar portion 35 which serves as workpiece contacting reference surface will be equal to the desired length.

Next, the workpiece is placed on cutting device 9. At this time, the workpiece is placed thereon in such fashion as to cause the portion on the side thereof which is opposite the location that will be cut to come in contact with the tip of bar portion 35. Workpiece securing member 95 is used to reliably secure the workpiece in this state, and when engagement/retraction lever 92 is actuated, by lowering cutting blade 91 which is in a state in which it is swiveled to 45° it will be possible to cause the workpiece to be cut to the desired length and in such fashion that the cutting plane is inclined 45° to the length measuring direction.

Above, length measuring apparatus 1 associated with the present embodiment has been described in detail, length measuring apparatus 1 being such that causing angle gauge member 40 to be mounted in removably installable fashion to the tip of arm member 30 which comes in contact with the workpiece at sliding unit 20 makes it possible to precisely measure the cutting angle of cutting blade 91 in advance and to precisely carry out fine adjustment so as to cause the cutting angle of cutting blade 91 to be a desired angle, and makes it possible to precisely cut the workpiece at the desired cutting angle.

Furthermore, in accordance with the present embodiment, by causing angle gauge member 40 which measures the cutting angle of cutting blade 91 to be mounted not to cutting device 9 but to length measuring apparatus 1 which is a separate body from cutting device 9, it will be possible without altering an existing cutting device 9 to retrofit it with a measuring apparatus 1 to easily permit precise measurement of cutting angle.

Moreover, the present invention is not limited to the foregoing embodiment but admits of any number of variations without departing from the gist of the present invention. For example, the shapes and sizes of the respective parts that make up the length measuring apparatus associated with the present embodiment may be varied as appropriate.

Furthermore, whereas the constitution of the foregoing embodiment was such that a length measuring apparatus used in combination with a cutting device was directly secured to and mounted on the cutting device, it being sufficient that the constitution be such as to allow the length measuring apparatus to be stably secured relative to the cutting device in such fashion as to permit the length of the workpiece to be measured at a location in the vicinity of the cutting device, a freestanding length measuring apparatus may be installed on the floor in the vicinity of the cutting device.

Furthermore, whereas the constitution of the foregoing embodiment was such that an angle gauge member was mounted in removably installable fashion to the tip portion of a bar portion of an arm member, removal of the angle gauge member making it possible for the tip of the arm member to come in contact with the workpiece at a time when length is to be measured, other constitutions may be adopted as appropriate so long as the constitution is such as to permit the tip of the arm member to come in contact with the workpiece at a time when length is to be measured.

For example, the constitution may be such that the angle gauge member is mounted to the tip portion of the arm member by way of a mounting member that is collapsible, rotatable, or otherwise transformable in shape, transformation in the shape of the mounting member causing the rotary contacting unit of the angle gauge member to move toward the trunk of the arm member and making it possible for the tip of the arm member to come in contact with the workpiece at a time when length is to be measured.

A second embodiment of the present invention will now be described with reference to FIG. 8 through FIG. 11. Because length measuring apparatus 1' associated with the second embodiment is such that the constitution of angle gauge member 40' differs from that of the foregoing first embodiment, description will primarily be given with respect to elements of differing constitution, description being omitted where the constitutions are similar.

At the first embodiment, digital angle gauge 50 of angle gauge member 40 was secured to arm member 30 by way of gauge base platform 41. Where this is the case, there are situations in which cutting device 9 may, depending on the device, be such as to make it difficult to cause swivelable cutting blade 91 to be precisely positioned at the initial position (0°) perpendicular to the length measuring direction, and because any misalignment of the initial position will cause misalignment of the reference position when angle gauge member 40 is reset to 0°, this means that the value measured by angle gauge member 40 as the angle to be cut by cutting blade 91 will also no longer be accurate.

In accordance with the present embodiment, the reference position at the time that angle gauge member 40' is reset to 0° is taken to be workpiece contacting reference surface 93 (−90°) which serves as reference surface when the workpiece is placed on cutting device 9, and angle gauge member 40' is constituted so as to make digital angle gauge 50' and rotary contacting unit 57' capable of sliding in a direction perpendicular to the length measuring direction so as to allow contacting surface 57'a of angle gauge member 40' to come in contact with workpiece contacting reference surface 93.

Workpiece contacting reference surface 93 of cutting device 9 is formed so as to be a surface that is parallel to the direction in which length of the workpiece which is placed at the cutting position is measured by length measuring apparatus 1', and is disposed at a location which is separated from the cutting position of cutting blade 91 in a direction perpendicular to the length measuring direction.

Accordingly, to allow contacting surface 57'a of angle gauge member 40' which is mounted so as to be capable of coming in contact with cutting blade 91 at the cutting position to come in contact with workpiece contacting reference surface 93, it is preferred that the constitution be such that digital angle gauge 50' which rotatably supports rotary contacting unit 57' is made capable of sliding in a direction perpendicular to the length measuring direction.

Figure 8:
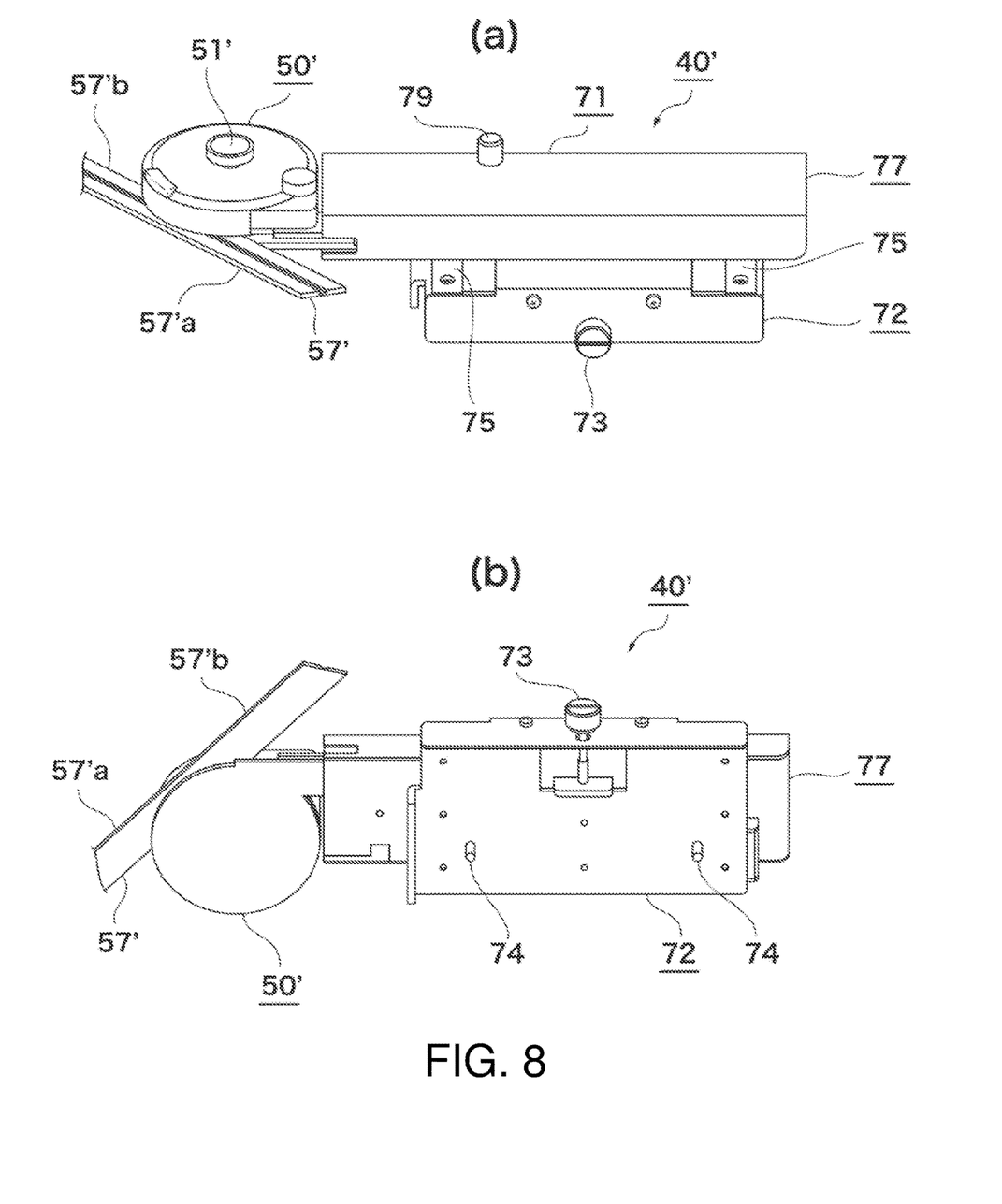
FIG. 8 is a drawing showing the constitution of an angle gauge member associated with a second embodiment of the present invention.

As shown in FIG. 8, angle gauge member 40' is provided with gauge base platform 71 that retains digital angle gauge 50' in such fashion that it is capable of sliding in a direction perpendicular to the length measuring direction. Gauge base platform 71 is provided with angle gauge base unit 72 which is secured to arm member 30, and angle gauge sliding unit 77 which is retained so as to be capable of sliding in a direction perpendicular to the length measuring direction with respect to angle gauge base unit 72.

Angle gauge base unit 72 is provided with securing screw 73 for securing it to arm member 30, coupling projections 74 which are inserted in coupling holes 36 of arm member 30, and slide rails 75. Angle gauge sliding unit 77 is provided with a linear guide (not shown) which is slidably coupled to slide rails 75, and slide mechanism locking screw 79 for locking the slide mechanism of the linear guide (not shown) so as to prevent sliding thereof.

Slide rails 75 of angle gauge base unit 72 are mounted so as to extend in a direction perpendicular to the length measuring direction, angle gauge sliding unit 77 is capable of sliding in a direction perpendicular to the length measuring direction, and slide mechanism locking screw 79 is capable of locking the slide mechanism such that angle gauge sliding unit 77 is in any desired positional relationship relative to slide rails 75.

Digital angle gauge 50' is secured to the tip of angle gauge sliding unit 77 which is toward the cutting position, and rotary contacting unit 57' and digital angle gauge 50' are capable of being secured in integral fashion at any desired position in a direction perpendicular to the length measuring direction.

Accordingly, with angle gauge member 40' mounted to the tip of arm member 30, by causing arm member 30 to slide until angle gauge member 40' is located in the vicinity of the cutting position of cutting blade 91, and thereafter causing angle gauge sliding unit 77 to slide in a direction such as will decrease the distance therefrom to workpiece contacting reference surface 93 in a direction perpendicular to the length measuring direction, it will be possible to cause contacting surface 57'a of rotary contacting unit 57' to come in contact with workpiece contacting reference surface 93.

Rotary contacting unit 57' associated with the second embodiment is such that the upper leg portion 57'b of the "T" in which it is shaped is formed so as to be longer than at the first embodiment, and is moreover constituted such that upper leg portion 57'b is slidable in the direction in which it extends. That is, rotary contacting unit 57' is capable of rotating about the basal portion of the "T" which is secured to input shaft 51', and contacting surface 57'a is capable of sliding in the direction in which upper leg portion 57'b extends. Thus, if contacting surface 57'a is slidable, it will be possible to satisfactorily cause it to come in contact with cutting blade 91 and workpiece contacting reference surface 93.

Figure 9:
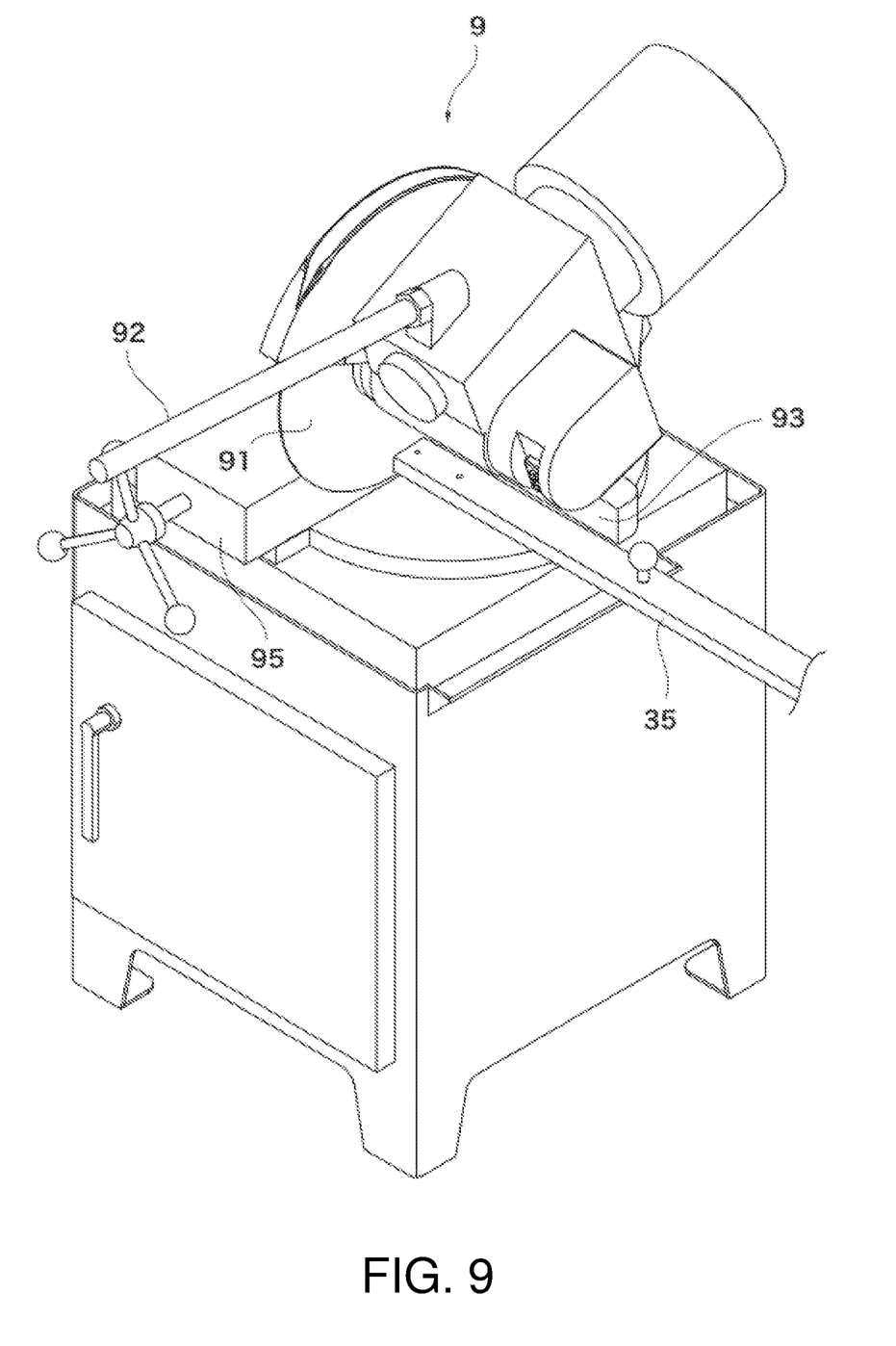
FIG. 9 is a plan view to assist in describing a manner in which the length measuring apparatus associated with the second embodiment of the present invention might be used.

Next, the sequence of steps for adjustment of cutting angle (45°) by length measuring apparatus 1' in accordance with the second embodiment will be described. As shown in FIG. 9, the tip of arm member 30, from which angle gauge member 40' has been removed, is first made to come in contact with the surface of cutting blade 91 which is located in the cutting position, and the datum at digital length measuring unit 60 is reset.

Figure 10:
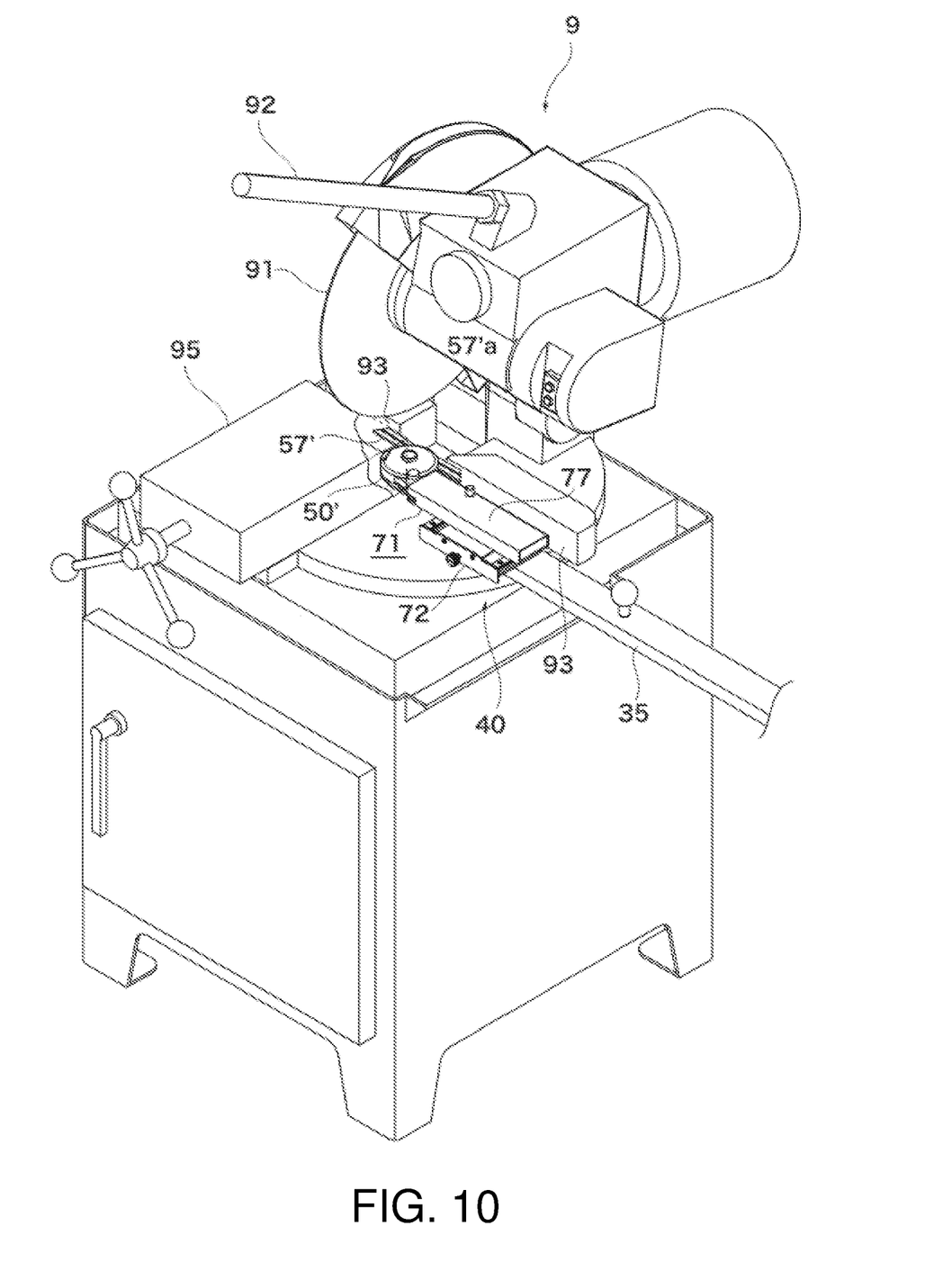
FIG. 10 is a plan view to assist in describing a manner in which the length measuring apparatus associated with the second embodiment of the present invention might be used.

Next, as was the case at the first embodiment, angle gauge member 40' is mounted to the tip of arm member 30, and sliding unit 20 is made to slide in the length measuring direction until angle gauge member 40' is moved to the vicinity of cutting position. Then, as shown in FIG. 10, gauge base platform 71 is made to slide in a direction perpendicular to the length measuring direction, and contacting surface 57'a is made to come in contact with workpiece contacting reference surface 93 which serves as reference position, and while in this state the measured angle of digital angle gauge 50' is reset to −90°.

Figure 11:
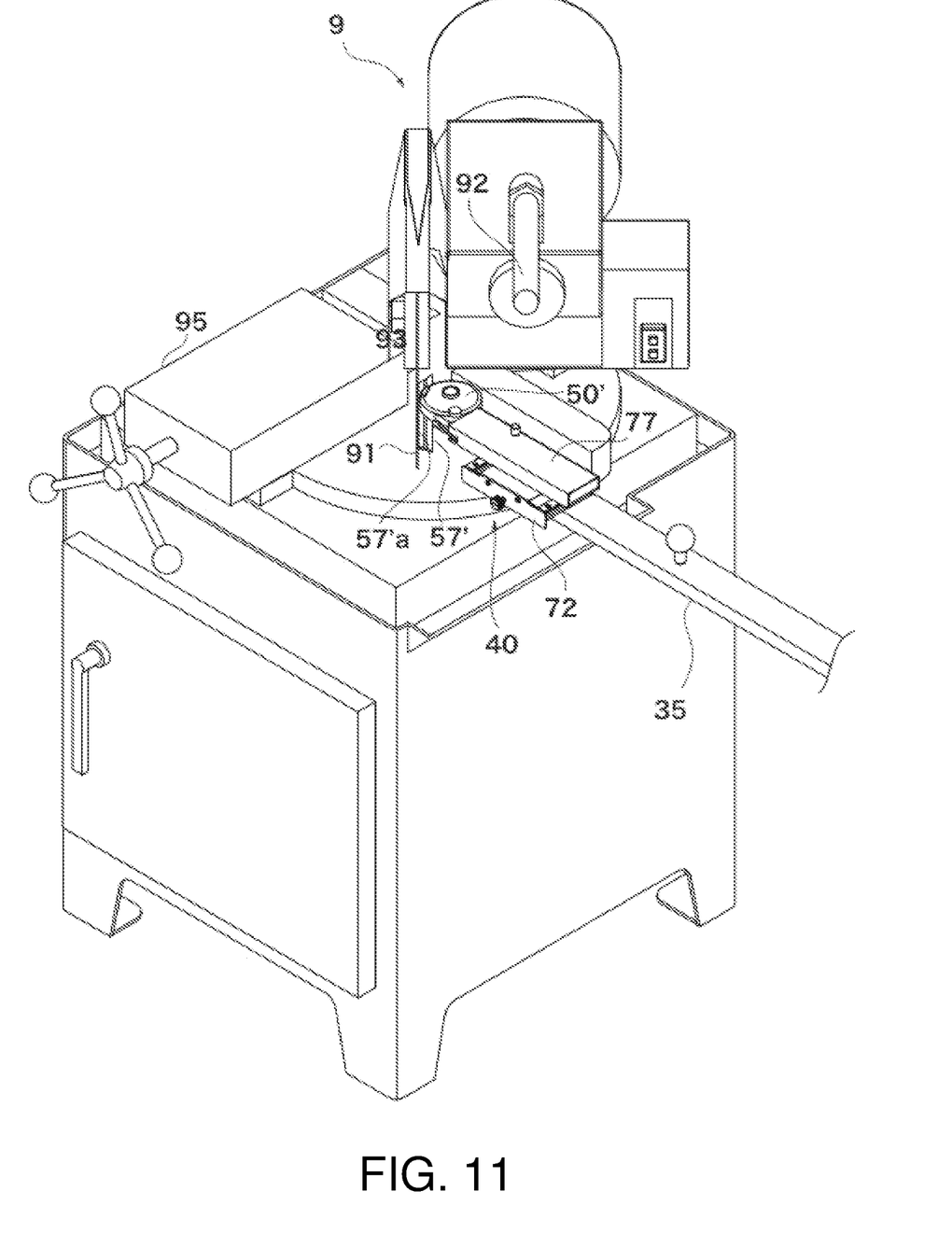
FIG. 11 is a plan view to assist in describing a manner in which the length measuring apparatus associated with the second embodiment of the present invention might be used.

After this has been reset, angle gauge member 40' is retracted and cutting blade 91 is swiveled to a position at which it is at the desired cutting angle of 45°, following which, as shown in FIG. 11, contacting surface 57'a of angle gauge member 40' is made to come in contact with cutting blade 91 and the cutting angle is repeatedly measured to carry out fine adjustment of the swivel angle until that measured value is precisely 45°.

As described above, the second embodiment provides operation and effect similar to those at the first embodiment; and moreover, because it makes it possible to carry out measurement of the cutting angle at cutting blade 91 by angle gauge member 40' not through use of cutting blade 91 as reference but through use of workpiece contacting reference surface 93 which will serve as reference surface for placement of the workpiece at the time of cutting, it makes precise measurement of the cutting angle possible.

Of course, the second embodiment, like the first embodiment, is not limited to the foregoing embodiment but admits of any number of variations without departing from the gist of the present invention.

EXPLANATION OF REFERENCE NUMERALS

1 Length measuring apparatus
10 Base unit
11 Base platform
13 Slide rail
14 Slide groove
15 Slide stopper
20 Sliding unit
21 Sliding body
22 Linear guide
25 Clamp
27 Arm retaining unit
28 Arm support shaft
29 Spring 30 Arm member
32 Trunk portion
35 Bar portion
36 Coupling hole
40 Angle gauge member
41 Gauge base platform
42 Securing screw
43 Coupling projection
50 Digital angle gauge
51 Input shaft
52 Display unit
53 Reset button
57 Rotary contacting unit
57*a* Contacting surface
60 Digital length measuring unit
61 Distance measuring unit
62 Display unit
65 Reset button
9 Cutting device
91 Cutting blade
92 Engagement/retraction lever
93 Workpiece contacting reference surface
95 Workpiece securing member
1' Length measuring apparatus
40' Angle gauge member
71 Gauge base platform
72 Angle gauge base unit
73 Securing screw
74 Coupling projection
75 Slide rail
77 Angle gauge sliding unit
79 Slide mechanism locking screw
50' Digital angle gauge
51' Input shaft
57' Rotary contacting unit
57'*a* Contacting surface
57'*b* Upper leg portion

What is claimed is:

1. A length measuring apparatus for use in combination with a cutting device having a cutting blade to measure a length of a workpiece cut by the cutting blade, the length measuring apparatus comprising:
    a slide rail which is secured relative to the cutting device when the length is measured; and
    a sliding unit that is slidably mounted to the slide rail, the sliding unit having
        a sliding body,
        a length measuring unit that measures a distance along which the sliding body slides relative to the slide rail, and
        an arm member that comes in contact with the workpiece when the workpiece is placed at a cutting position;
    wherein the sliding unit further comprises an angle gauge member, mounted on that tip portion of the arm member which comes in contact with the workpiece, that comes in contact with the cutting blade and measures a cutting angle of the cutting blade;
    wherein the angle gauge member comprises
        a base platform which is removably installable on the arm member,
        a digital angle gauge which is secured to the base platform, and
        a rotary contacting unit which is secured in integral fashion to an input shaft of the digital angle gauge, and which has a contacting surface that comes in contact with the cutting blade;
    wherein the base platform comprises
        an angle gauge base unit which is removably installable on the arm member, and
        an angle gauge sliding unit which is mounted so as to be capable of sliding, in a direction perpendicular to a length measuring direction of the length measuring unit, with respect to the angle gauge base unit; and
    wherein the digital angle gauge is secured to the angle gauge sliding unit.

2. The length measuring apparatus according to claim 1 wherein the angle gauge member is mounted in removably installable fashion on the tip portion of the arm member.

3. The length measuring apparatus according to claim 1 wherein the angle gauge member is constituted such that the contacting surface protrudes further in a tip direction beyond that tip of the arm member which comes in contact with the workpiece when the angle gauge member is mounted on the arm member and the cutting angle is measured.

* * * * *